United States Patent
Haseyama et al.

(10) Patent No.: US 12,393,041 B2
(45) Date of Patent: Aug. 19, 2025

(54) BEAM INTENSITY UNIFORMIZING ELEMENT

(71) Applicant: Panasonic Intellectual Property Management Co., Ltd., Osaka (JP)

(72) Inventors: Ryo Haseyama, Osaka (JP); Manabu Orita, Osaka (JP); Toshimi Nishiyama, Osaka (JP); Atsushi Ashino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 434 days.

(21) Appl. No.: 17/998,947

(22) PCT Filed: Mar. 9, 2021

(86) PCT No.: PCT/JP2021/009131
§ 371 (c)(1),
(2) Date: Nov. 16, 2022

(87) PCT Pub. No.: WO2022/018901
PCT Pub. Date: Jan. 27, 2022

(65) Prior Publication Data
US 2023/0229013 A1      Jul. 20, 2023

(30) Foreign Application Priority Data

Jul. 21, 2020   (JP) ................. 2020-124244

(51) Int. Cl.
G02B 27/09     (2006.01)
G02B 3/00      (2006.01)

(52) U.S. Cl.
CPC ....... G02B 27/0961 (2013.01); G02B 3/0025 (2013.01); G02B 27/0927 (2013.01); *G02B 3/0043* (2013.01)

(58) Field of Classification Search
None
See application file for complete search history.

(56) References Cited

U.S. PATENT DOCUMENTS

2020/0171602 A1    6/2020  Mizumura
2020/0218077 A1*   7/2020  Li ................. G02B 3/0062
(Continued)

FOREIGN PATENT DOCUMENTS

| CN | 110945627 A | 3/2020 |
| JP | 2006-091328 A | 4/2006 |
| JP | 2016-001225 | 1/2016 |

OTHER PUBLICATIONS

International Search Report of PCT application No. PCT/JP2021/009131 dated Jun. 1, 2021.
(Continued)

*Primary Examiner* — Robert E. Tallman
(74) *Attorney, Agent, or Firm* — Rimon P.C.

(57) ABSTRACT

A beam intensity uniformizing element includes an optical base, a first lens array disposed at a front surface of the optical base; and a second lens array disposed at a back surface of the optical base. The first lens array includes first mold lens cells arranged in different directions along the front surface of the optical base. The first mold lens cells have surfaces constituting the front surface of the optical base. The surfaces of the first mold lens cells have first linear marks thereon extending in a first direction. The second lens array includes second mold lens cells arranged in different directions along the back surface of the optical base. The second mold lens cells have surfaces constituting the back surface of the optical base. The surfaces of the second mold lens cells have second linear marks thereon extending in a second direction different from the first direction. This element suppresses generation of an interference pattern and reduces cost.

2 Claims, 3 Drawing Sheets

(56) References Cited

U.S. PATENT DOCUMENTS

2021/0003911 A1* 1/2021 Ooi .................... G02B 3/0056
2021/0033753 A1* 2/2021 Lee .................... G02B 3/0012

OTHER PUBLICATIONS

English Translation of Chinese Office Action dated May 31, 2025 for the related Chinese Patent Application No. 202180042660.4.

* cited by examiner

BEAM INTENSITY UNIFORMIZING ELEMENT

TECHNICAL FIELD

The present disclosure relates to a beam intensity uniformizing element for uniformizing light intensity distribution of a light beam.

BACKGROUND ART

A beam intensity uniformizing element includes a lens array. The lens array has a structure in which plural lens cells are arranged two-dimensionally. The lens array is produced by the so-called molding, in which a glass material is press-molded with a mold. A molding surface of the mold used for molding a lens for transferring the lens surface is produced by cutting machining. Therefore, the molding surface has linear machining marks formed thereon along the direction of the cutting. The machining marks are transferred to the surfaces of the mold lens cells as linear marks. Appearing regularly on the surfaces of the mold lens cells, the linear marks may cause the light beam transmitted through the mold lens cells to generate an interference pattern.

To suppress generation of the interference pattern, such a structure was proposed that the pitches of the linear marks formed on adjacent two of the mold lens cells in the lens array are different from each other.

A conventional beam intensity uniformizing element is disclosed, for example, in PTL1.

CITATION LIST

Patent Literature

PTL 1: Unexamined Japanese Patent Publication No. 2016-1225

SUMMARY OF THE INVENTION

To produce the above-mentioned conventional beam intensity uniformizing element in which the pitches of the linear marks are changed on a lens cell by lens cell basis, it is necessary to change the machining conditions for forming the molding surface of the mold on a lens cell by lens cell basis. Machining of the mold for molding the lens array thus becomes extremely complicated. Accordingly, the cost of producing the mold increases, and, as a result, the cost of the lens array increases.

A beam intensity uniformizing element includes an optical base, a first lens array disposed at a front surface of the optical base, and a second lens array disposed at a back surface of the optical base. The first lens array includes first mold lens cells arranged in different directions along the front surface of the optical base. The first mold lens cells have surfaces constituting the front surface of the optical base. The surfaces of the first mold lens cells have first linear marks thereon extending in a first direction. The second lens array includes second mold lens cells arranged in different directions along the back surface of the optical base. The second mold lens cells have surfaces constituting the back surface of the optical base. The surfaces of the second mold lens cells have second linear marks thereon extending in a second direction different from the first direction.

This beam intensity uniformizing element suppresses generation of an interference pattern and reduces cost.

DESCRIPTION OF EMBODIMENTS

Figure 1:
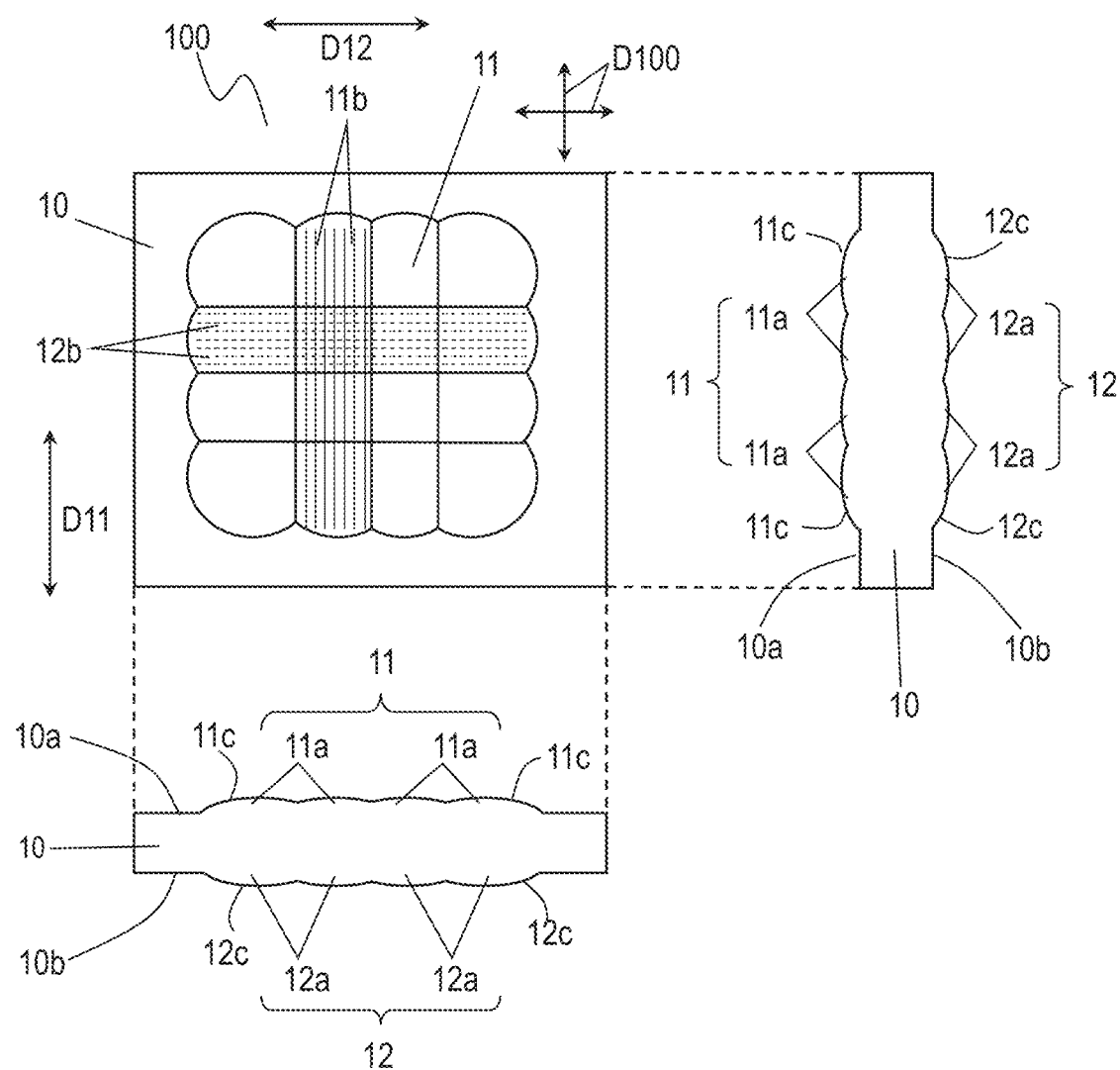
FIG. 1 is a schematic trihedral figure of a beam intensity uniformizing element according to an exemplary embodiment of the present disclosure.

Hereinafter, a beam intensity uniformizing element according to an exemplary embodiment of the present disclosure will be described with reference to the drawings. Each of the following exemplary embodiments shows merely a preferred example of the present disclosure. Accordingly, the shapes, structural components, arrangements and connections of the structural components, and the like are merely examples, and are not intended to limit the present disclosure. Therefore, among the components in the following exemplary embodiments, those components that are not included in an independent claim defining the broadest generic concept of the present invention will be explained as arbitrary components.

Also, each figure in the drawings is a schematic figure, which is not always drawn accurately. Also, similar components are indicated by like reference marks throughout the drawings, and duplicate description on them may sometimes be omitted or simplified.

FIG. 1 is a trihedral figure of beam intensity uniformizing element 100 according to an exemplary embodiment of the present disclosure.

Beam intensity uniformizing element 100 is an optical element configured to convert the light intensity distribution of an input light beam and outputs an intensity-distribution-converted light beam. For example, light beam intensity uniformizing element 100 converts a light beam having a Gaussian beam intensity distribution outputted from a laser diode to a light beam having a flat top beam intensity distribution and outputs the converted light beam. Beam intensity uniformizing element 100 includes, as a basic structure, optical base 10 having front surface 10a and back surface 10b which are opposite to each other, lens array 11 disposed at front surface 10a of optical base 10, and lens array 12 disposed at back surface 10b of optical base 10.

Lens array 11 disposed at front surface 10a of optical base 10 includes plural mold lens cells 11a that are arranged two-dimensionally along front surface 10a of optical base 10. The mold lens cells 11a are arranged in plural different directions D100 along front surface 10a of optical base 10. In accordance with the embodiment, sixteen (16) mold lens cells 11a are arranged in a matrix with four columns and four rows. The mold lens cells 11a have surfaces 11c having plural linear marks 11b thereon extending in direction D11. Surfaces 11c constitute front surface 10a of optical base 10. Plural vertical solid lines drawn in the second column of mold lens cells 11a counted from the left in FIG. 1 indicate linear marks 11b formed on front surface 10a of optical base 10. Although linear marks 11b are drawn only in the second column of mold lens cells 11a counted from the left for convenience of drawing, linear marks 11b have actually been formed on all columns of mold lens cells 11a. Details regarding linear marks 11b will be described later.

Lens array 12 disposed at back surface 10b of optical base 10 includes plural mold lens cells 12a that are arranged two-dimensionally along back surface 10b of optical base 10. The mold lens cells 11a are arranged in plural different directions D100 along back surface 10b of optical base 10. In accordance with the embodiment, sixteen (16) mold lens cells 12a are arranged in a matrix with four columns and four rows. The mold lens cells 12a have surfaces 12c having plural linear marks 12b thereon extending in direction D12. Surfaces 12c constitute back surface 10b of optical base 10. Plural horizontal solid lines drawn in the second row of mold lens cells 12a counted from the top in FIG. 1 indicate linear marks 12b formed on back surface 10b of optical base 10. Although linear marks 12b are drawn in only the second row of mold lens cells 12a counted from the top for convenience of drawing, linear marks 12b have actually been formed on all rows of mold lens cells 12a. Details regarding linear marks 12b will be described later.

Each of mold lens cells 11a disposed on front surface 10a of optical base 10 faces a corresponding one of mold lens cells 12a disposed on back surface 10b of optical base 10.

Figure 2:
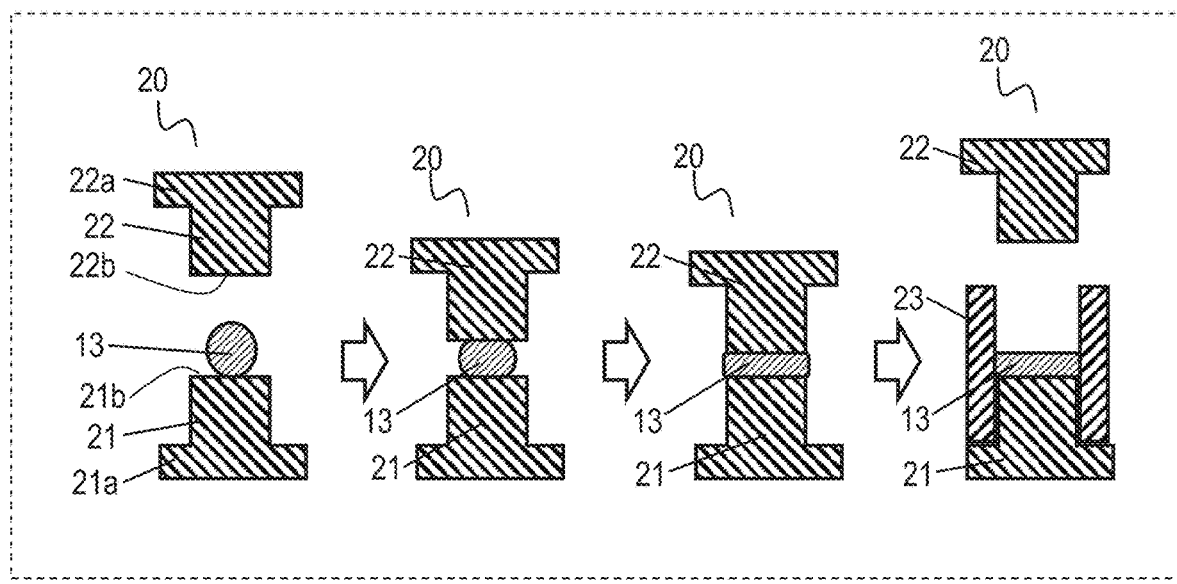
FIG. 2 is a schematic diagram of the beam intensity uniformizing element according to the embodiment for showing a method of producing the beam intensity uniformizing element.

A method of producing beam intensity uniformizing element 100 will be described below. FIG. 2 schematically shows processes of producing beam intensity uniformizing element 100. Molding machine 20 for producing beam intensity uniformizing element 100 includes lower mold 21 and upper mold 22.

An upper surface of lower mold 21 is molding surface 21b for forming lens array 12. Molding surface 21b has a shape for transferring shapes corresponding to surfaces 12c of plural mold lens cells 12a to back surface 10b of optical base 10.

A lower surface of upper mold 22 is molding surface 22b configured to form lens array 11. Molding surface 22b has a shape transferring the surfaces of plural mold lens cells 11a to front surface 10a of optical base 10.

Beam intensity uniformizing element 100 is produced by molding a glass material 13 made of optical glass. First, as shown in a figure, glass material 13 is placed on molding surface 21b of lower mold 21. Then, glass material 13 is heated. After the temperature of glass material 13 rises to a temperature at which glass material 13 can be press-molded, glass material 13 is press-molded with lower mold 21 and upper mold 22. Then, glass material 13 having been press-molded is cooled. Glass material 13 having been press-molded, or beam intensity uniformizing element 100, is taken out of between lower mold 21 and upper mold 22.

Figure 3:
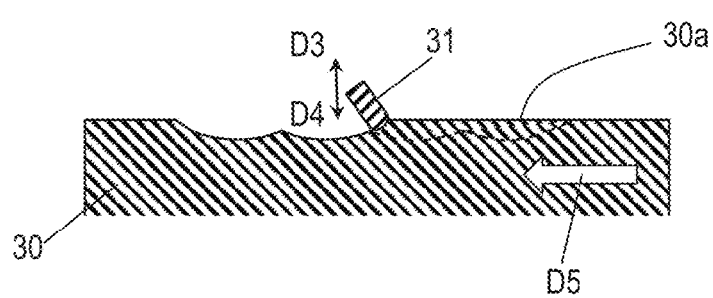
FIG. 3 is a schematic diagram of a molding surface of a mold for a molding machine used in the producing method according to the embodiment for showing a method of producing the molding surface of the mold.

Plural linear marks 11b and 12b have been formed on the surfaces of mold lens cells 11a and 12a of beam intensity uniformizing element 100, respectively, produced as described above. Linear marks 11b and 12b are caused by processes of forming the respective molding surfaces 21b and 22b of lower mold 21 and upper mold 22. The respective molding surfaces 21b and 22b of lower mold 21 and upper mold 22 are produced by cutting machining. A working image of the cutting machining is shown in FIG. 3. In the cutting machining, machining surface 30a is cut with cutting tool 31. While the sag of cutting tool 31 cut into machining surface 30a is adjusted by moving cutting tool 31 in upward direction D3 and downward direction D4, cutting tool 31 moves linearly in direction D5 perpendicular to both upper direction D3 and lower direction D4. Since cutting tool 31 cuts machining surface 30a linearly, the cutting work is performed such that cutting of a part of the molding surface for forming the mold lenses in one row is completed, and then cutting tool 31 is moved relative to glass material 13 and started to cut a part of the molding surface for forming mold lenses in an adjacent row. These steps are repeated to produce the molding surface. Therefore, after the cutting process, linear machined marks are formed on machined surface 30a at constant pitches corresponding to the cutting pitches at which cutting tool moves. Plural machined marks formed on one machined surface 30a are parallel to each other. Use of machined surface 30a having these machined marks to produce lens array 11 causes the machined marks to be transferred to the surfaces of mold lens arrays 11 and 12, or surfaces 11c and 12c of mold lens cells 11a and 12a, respectively. The machined marks transferred to surfaces 11c and 12c of mold lens cells 11a and 12a, respectively, become linear marks 11b and 12b, respectively, as shown in FIG. 1.

Beam intensity uniformizing element 100 has an integrated structure in which two lens arrays 11 and 12 are disposed at front surface 10a and back surface 10b of optical base 10, respectively. Extending direction D11 in which linear marks 11b extend on lens array 11 on front surface 10a is different from extending direction D12 in which linear marks 12b extend on lens array 12 on back surface 10b. As described above, linear marks 11b and 12b of lens arrays 11 and 12 could be a cause of generating an interference pattern. However, since extending directions D11 and D12 of linear marks 11b and 12b on two lens arrays 11 and 12 are different from each other, the direction of the interference pattern formed by lens array 11 becomes different from the direction of the interference pattern formed by lens array 12. As a result, the two interference patterns interfere with each other to suppress generation of an interference pattern of beam intensity uniformizing element 100.

Figure 4:
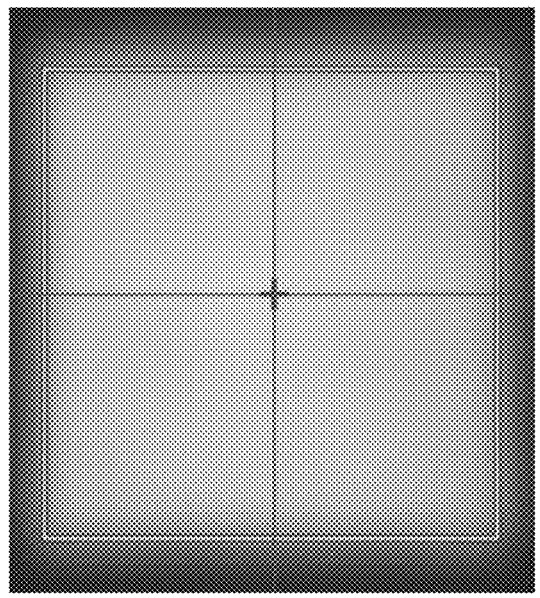
FIG. 4 shows an interference pattern generated by the beam intensity uniformizing element according to the embodiment.
Figure 5:
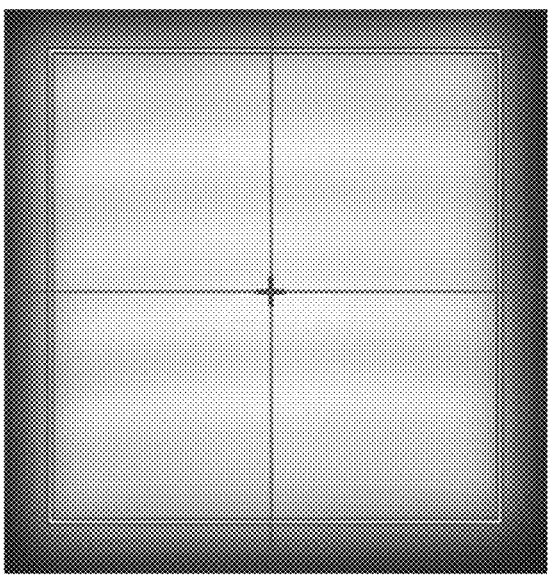
FIG. 5 shows an interference pattern generated by a comparative example of a beam intensity uniformizing element in which linear marks extend in the same direction.

To suppress generation of an interference pattern of beam intensity uniformizing element 100 more effectively, lens arrays 11 and 12 are arranged such that extending direction D11 of linear marks 11b on lens array 11 is perpendicular to extending direction D12 of linear marks 12b on lens array 12. FIG. 4 shows an interference pattern of beam intensity uniformizing element 100 in which directions D11 and D12 are perpendicular to each other. No clear interference pattern is observed in FIG. 4. FIG. 5 shows an interference pattern of a comparative example of a beam intensity uniformizing element in which directions D11 and D12 are the same. A clear interference pattern is observed in FIG. 5. As shown in FIGS. 4 and 5, extending direction D11 of linear marks 11b on lens array 11 are perpendicular to extending direction D12 of linear marks 12b on lens array 12, thereby suppressing the interference pattern of beam intensity uniformizing element 100.

That is, in a method of suppressing an interference pattern by beam intensity uniformizing element 100 according to the present disclosure, the direction of linear marks 11b on lens array 11 are different from the direction of linear marks 12b on lens array 12. Accordingly, it is not necessary to change, as in the conventional manner, the pitches of the linear marks on a mold lens cell by mold lens cell basis. In other words, in beam intensity uniformizing element 100, pitches of linear marks 11b and 12b are constant. In this case, it is not necessary to change the cutting pitch in the cutting machining described with reference to FIG. 3. As a result, the machining time of the cutting machining is reduced, accordingly reducing the cost of beam intensity uniformizing element 100.

Further, since the cutting pitch is constant, the cutting pitch may be optimized. For example, the cutting pitch may be a minimum pitch of the cutting machine. Cutting by the minimum pitch increases the machining precision of the molding surface, accordingly reducing the light transmission loss in beam intensity uniformizing element 100.

To obtain a uniform distribution of light intensity, two or more lens arrays are disposed on the optical axis. The integrated structure in which two lens arrays are respectively disposed on front surface 10a and back surface 10b of optical base 10, as in beam intensity uniformizing element 100, guarantees the precision of the relative positions of two lens arrays 11 and 12 at the precision of the molds, accordingly enabling beam intensity uniformizing element 100 to be easily incorporated into a light source device.

INDUSTRIAL APPLICABILITY

The present disclosure provides such advantageous effects that generation of the interference pattern by the beam intensity uniformizing element can be suppressed and that the cost of the beam intensity uniformizing element can be reduced. The present disclosure is thus applicable particularly to laser light sources with a small size.

REFERENCE MARKS IN THE DRAWINGS 10 optical base
11, 12 lens array
11a, 12a mold lens cell
11b, 12b linear mark
100 beam intensity uniformizing element

The invention claimed is:

1. A beam intensity uniformizing element comprising:
an optical base having a front surface and a back surface which are opposite to each other;
a first lens array disposed at the front surface of the optical base; and
a second lens array disposed at the back surface of the optical base, wherein
the first lens array includes a plurality of first mold lens cells arranged in different directions along the front surface of the optical base, the plurality of first mold lens cells having surfaces constituting the front surface of the optical base, the surfaces of the plurality of first mold lens cells having plural first linear marks thereon extending in a first direction, and
the second lens array includes a plurality of second mold lens cells arranged in different directions along the back surface of the optical base, the plurality of second mold lens cells having surfaces constituting the back surface of the optical base, the surfaces of the plurality of second mold lens cells having plural second linear marks thereon extending in a second direction different from the first direction.

2. The beam intensity uniformizing element of claim 1, wherein the first direction is perpendicular to the second direction.

* * * * *